United States Patent
Chen

(10) Patent No.: US 6,551,739 B1
(45) Date of Patent: Apr. 22, 2003

(54) DC SUPPLYING ARRANGEMENT FOR SOAP FEEDING DEVICE

(76) Inventor: Yi-Chen Chen, No. 68-31, Yan Ji St., Da An Area, Taipei (TW)

( * ) Notice: Subject to any disclaimer, the term of this patent is extended or adjusted under 35 U.S.C. 154(b) by 396 days.

(21) Appl. No.: 09/599,860

(22) Filed: Jun. 23, 2000

(51) Int. Cl.⁷ .................................................. H01M 2/10
(52) U.S. Cl. ............................ 429/99; 429/96; 429/97
(58) Field of Search ........................... 429/97, 99, 100, 429/121, 122, 123; 222/420, 626, 627; 292/37, 140, DIG. 11

(56) References Cited

U.S. PATENT DOCUMENTS

| | | | | |
|---|---|---|---|---|
| 1,020,454 A | * | 3/1912 | Seidenbecker | 292/37 |
| 1,901,613 A | * | 3/1933 | Smith | 292/37 |
| 3,276,835 A | * | 10/1966 | Hall | 292/37 |
| 5,149,152 A | * | 9/1992 | Lanius | 292/140 |
| 5,379,917 A | * | 1/1995 | Brown et al. | 222/105 |
| 5,611,465 A | * | 3/1997 | Lee et al. | 222/214 |
| 6,041,971 A | * | 3/2000 | Pineda | 222/135 |
| 6,209,752 B1 | * | 4/2001 | Mitchell et al. | 222/181.3 |
| 6,293,428 B1 | * | 9/2001 | Chen | 222/420 |

FOREIGN PATENT DOCUMENTS

JP            57 025 668 A   *  2/1982 ................... 429/99

* cited by examiner

*Primary Examiner*—Patrick Ryan
*Assistant Examiner*—Gregg Cantelmo
(74) *Attorney, Agent, or Firm*—Bacon & Thomas, PLLC

(57) ABSTRACT

A soap feeding device. The device includes a soap reservoir and an arrangement for mounting a control device. The rear battery compartment includes a receiving space in which an opening is in the side of battery compartment for allowing a battery case containing several pairs of cells to be inserted, and the battery case is clung to two L-shaped tabs in the rear of frame. A peripheral groove is positioned around the frame, and a waterproof rubber ring is positioned around the peripheral groove. A peripheral flange is positioned in the front side of frame, and a pair of dividers is positioned on either side of the frame. A sliding block is positioned between the pair of dividers, and the sliding block has a latch extended from the slot on the annular flange.

6 Claims, 7 Drawing Sheets

DC SUPPLYING ARRANGEMENT FOR SOAP FEEDING DEVICE

FIELD OF THE INVENTION

The present invention relates to a DC supplying arrangement for soap feeding device with easy battery replacement characteristics.

BACKGROUND OF THE INVENTION

A conventional soap feeding device comprises a housing, a drive means, and a feeding means. Housing includes a reservoir for storing soap and an outlet in the bottom of the soap reservoir. Drive means and feeding means are provided within the lower portion of the housing. Drive means includes a reduction gear set and a driven gear. Feeding means comprises a cylinder in fluid communication with the outlet of the soap reservoir, a piston provided in the cylinder, and a rod having one end pivotably connected to the piston and the other end pivotably eccentrically connected to the driven gear. A circuit board is provided in the housing. The circuit board has an infrared sensor which is activated when the ray transmitted from infrared transmitter to infrared receiver is interrupted by an object (e.g., hand). Once sensor is activated, the drive means is activated too which in turn causes feeding means to extrude soap from outlet. As stated above, the rod is pivotably eccentrically connected to the driven gear of drive means. As such, the rod of feeding means may be activated by the driven gear which in turn causes piston to reciprocately move in the cylinder. Also, a vertical cylindrical member is abutted on and in fluid communication with the cylinder. Cylindrical member includes an outlet in the bottom and a slidable valve seat within the cylindrical member. The valve seat is a plate member having a plurality of through holes, a center axis, a spring put on the axis, and a valve provided in bottom being put on the axis, the valve is captively retained on the bottom of through holes. A post is pivotably connected to the bottom of housing. A press switch is provided on the circuit board. A bar is eccentrically provided on the driven gear. Bar is urged against the post for causing the post to press the switch. Above is a description of the actuation mechanism of a conventional DC supplying arrangement for soap feeding device, while no mention of the power supplying arrangement thereof. It is understood that a power cord is required and thus extended from housing if an alternating current (AC) source is used. It is also understood that an adaptor is required in the housing in order to convert external the AC source into direct current (DC) source and decrease the voltage to about several volts because the drive means of the soap feeding device is usually a small DC motor. Thus a precious space is occupied by that adaptor. Further, it is not power saving. In view of this, such AC based power supplying design is not desired. Usually, the power supplying arrangement of soap feeding device is implemented in a battery source. For example, four 1.5 volt cells are parallel connected in the battery compartment. That is, the output is DC 6 volt. Such battery compartment is only protected by a cover. It is convenient to replace batteries if they are low, while the batteries are susceptible to pilferage, for example when installed in a public place. A knob with a grooved surface is disclosed wherein the knob is fastened to the housing by a spring-detent mechanism. But this is unsatisfactory for the purpose for which the invention is concerned because it is not space saving.

SUMMARY OF THE INVENTION

It is thus an object of the present invention to provide a DC supplying arrangement for soap feeding device wherein the battery compartment is capable of containing four 1.5 volt cells. Battery compartment may be easily pulled out, while the power cord in the housing connected to the battery compartment may not be pulled out when replacing batteries. This means that battery compartment simply makes an electrical connection with the drive means of the soap feeding device by two contacts. Also, a snapping arrangement has been provided in the battery compartment in order to secure the battery compartment to the housing when battery compartment is snapped into the housing. Further, the chance of opening the cover of battery compartment by an unauthorized party is greatly reduced. Furthermore, a waterproof arrangement have been provided in the snapping arrangement of the battery compartment such that the soap feeding device of the invention is adapted to a humid environment without causing short circuit to the batteries.

To achieve the above and other objects, the present invention provides a DC supplying arrangement for soap feeding device. The soap feeding device is mounted in a housing comprising an upper housing having a reservoir for storing soap and a lower housing having an arrangement for mounting control device, a battery compartment provided in the rear portion of the arrangement, the battery compartment being laterally disposed having a receiving space, an opening provided in the side of battery compartment for allowing a battery case containing several pairs of cells to insert into, the battery case being clung to a pair of L-shaped tabs in the rear of a frame, a peripheral groove provided around the frame, a waterproof rubber ring provided around the peripheral groove, a peripheral flange provided in the front side of frame, a pair of dividers provided on either side of frame, a sliding block provided between the pair of dividers, the sliding block having a latch extended from the slot on the annular flange to snap in the corresponding recess of receiving space, frame having a peripheral tab snapped to the cover of battery compartment, and a knob provided on the center of the cover having an oval flange in the rear and a groove or key hole such that the turning of knob may cause the attached sliding block to move, thus locking or unlocking the battery compartment.

The above and other objects, features and advantages of the present invention will become apparent from the following detailed description taken with the accompanying drawings.

DETAILET DESCRIPTION OF THE PREFERRED EMBODIMENTS

Figure 1:
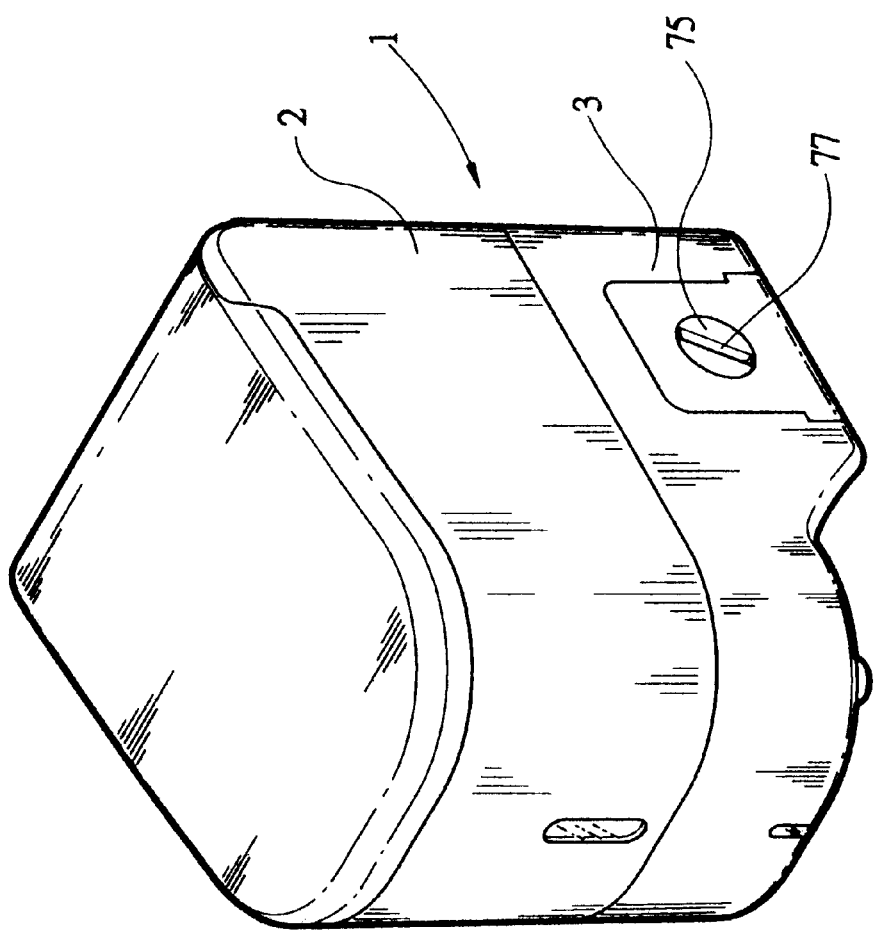
FIG. 1 is a perspective view of a preferred embodiment of soap feeding device according to the invention.
Figure 2:
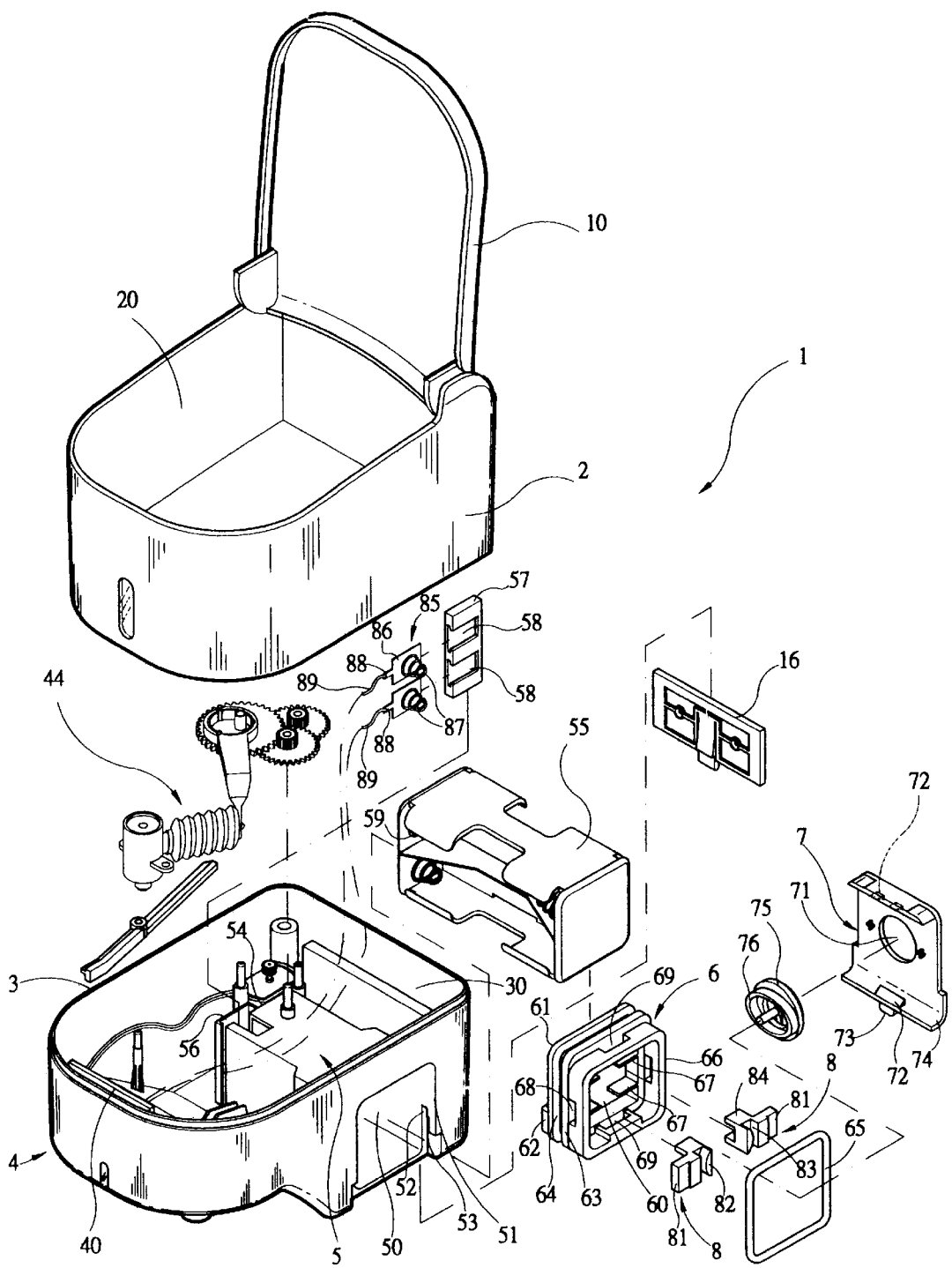
FIG. 2 is an exploded view of the soap feeding device FIG. 1.
Figure 3:
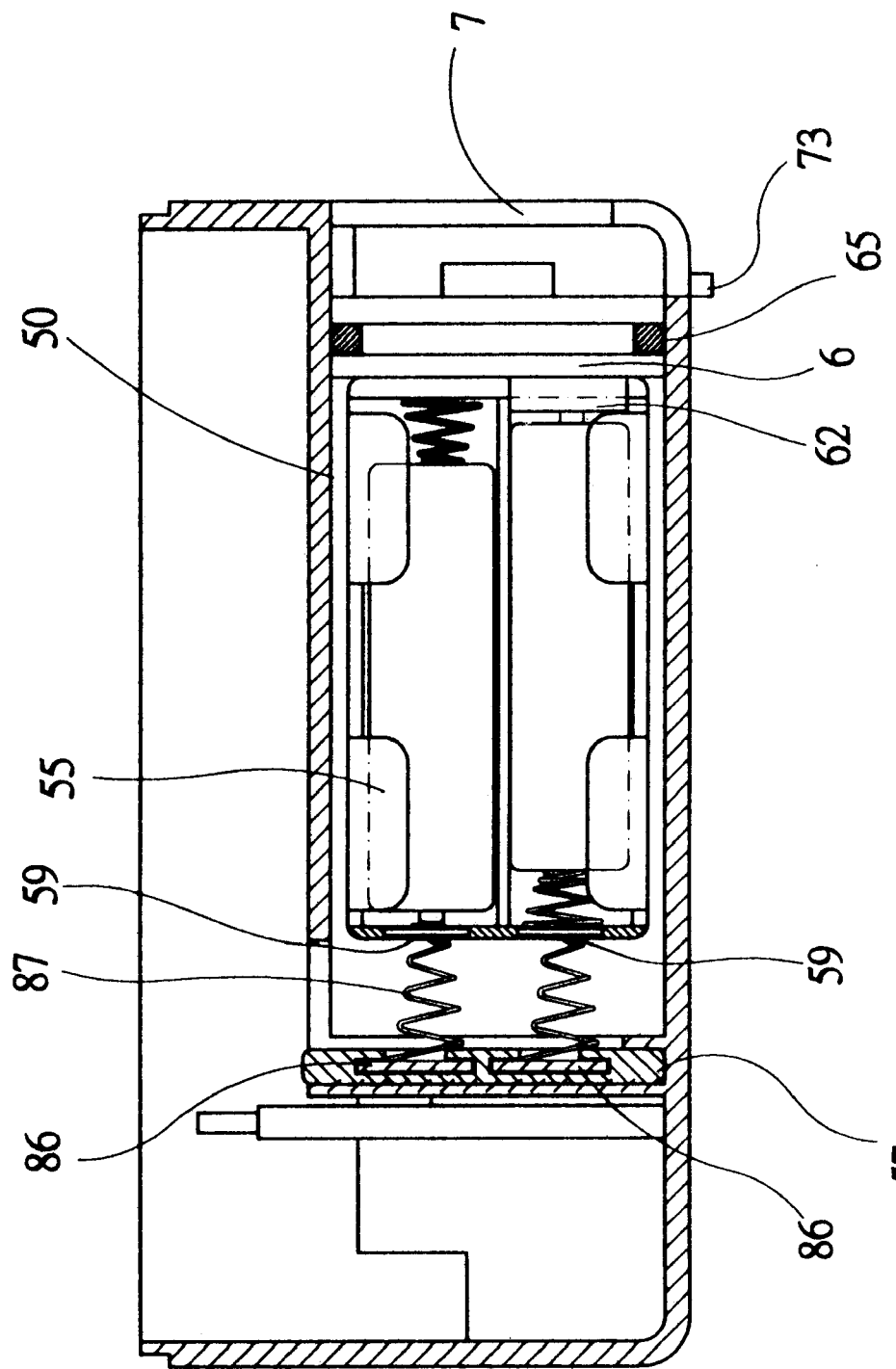
FIG. 3 is a cross-sectional view of the soap feeding device of FIG. 1.
Figure 4:
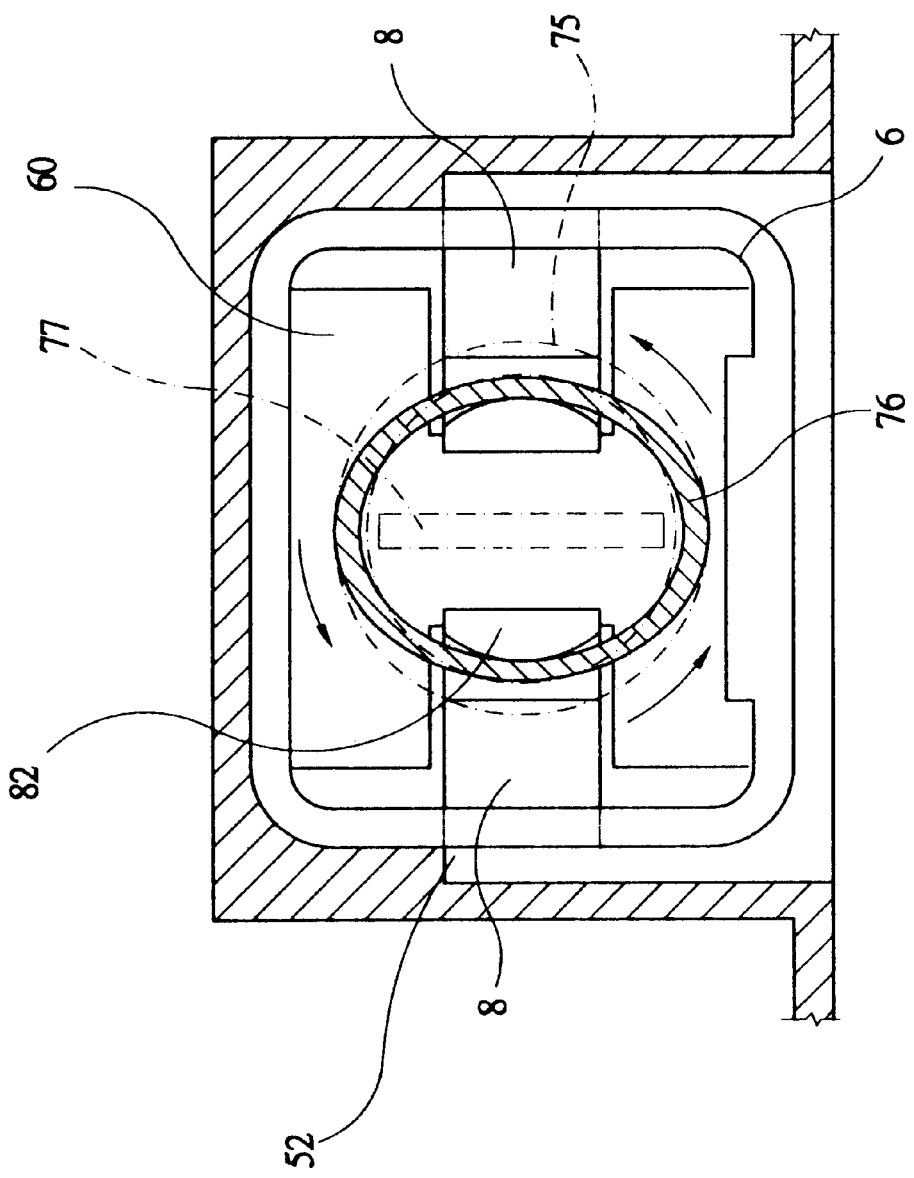
FIG. 4 is a cross-sectional view of frame of FIG. 2, where knob not turned.
Figure 5:
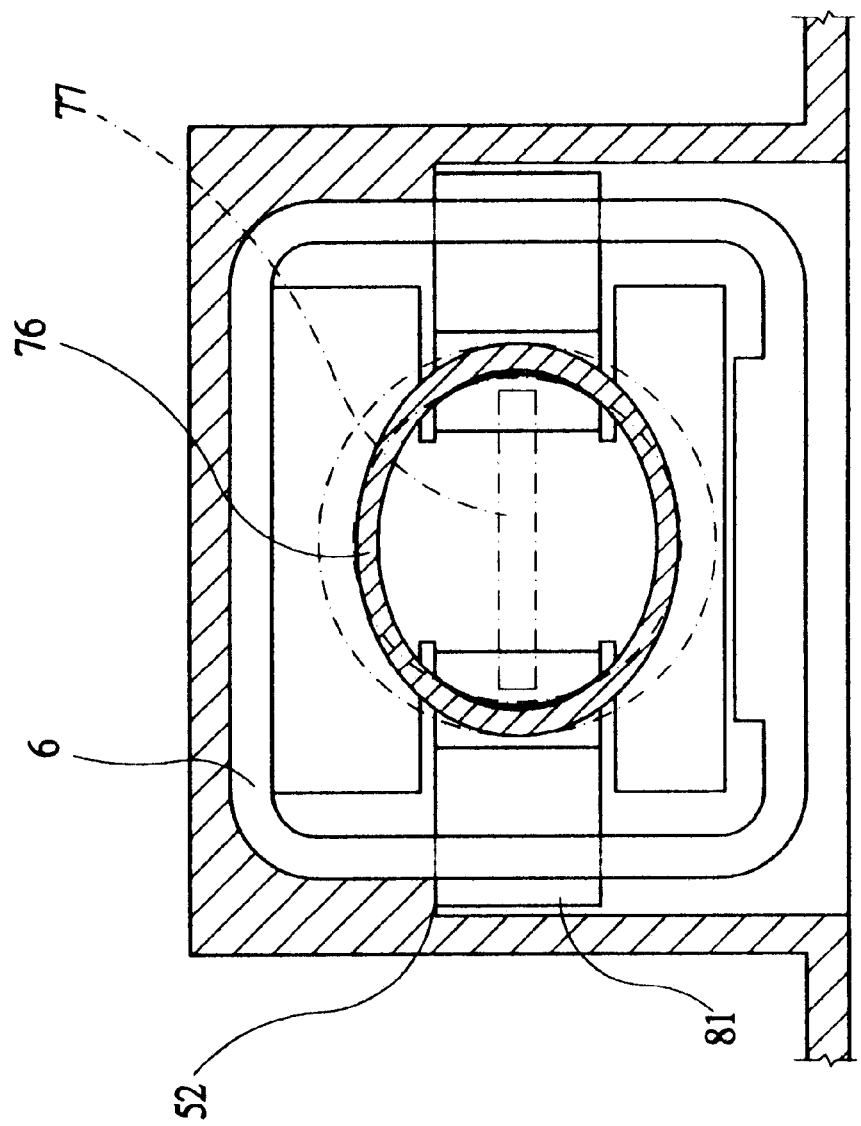
FIG. 5 is a view similar to FIG. 4, where knob turned about 90 degrees.
Figure 6:
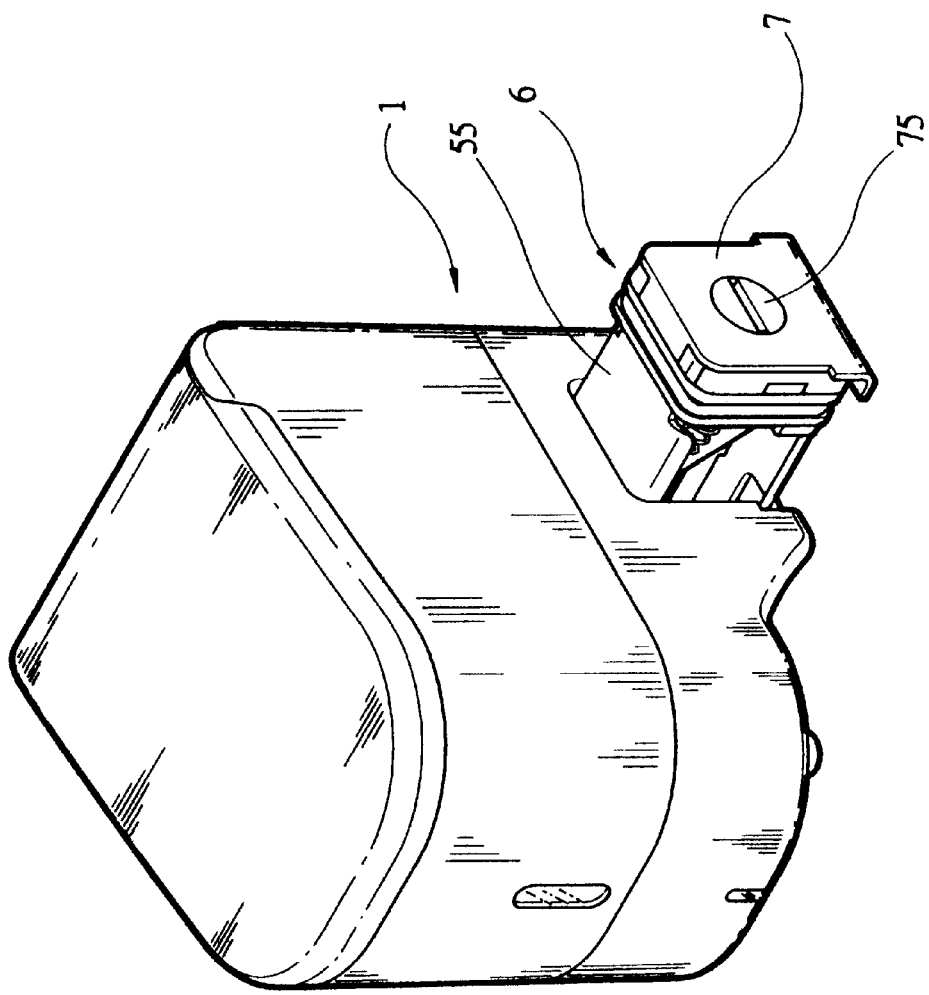
FIG. 6 is a perspective view showing the battery case pulled out a small distance, where the cover having a groove.
Figure 7:
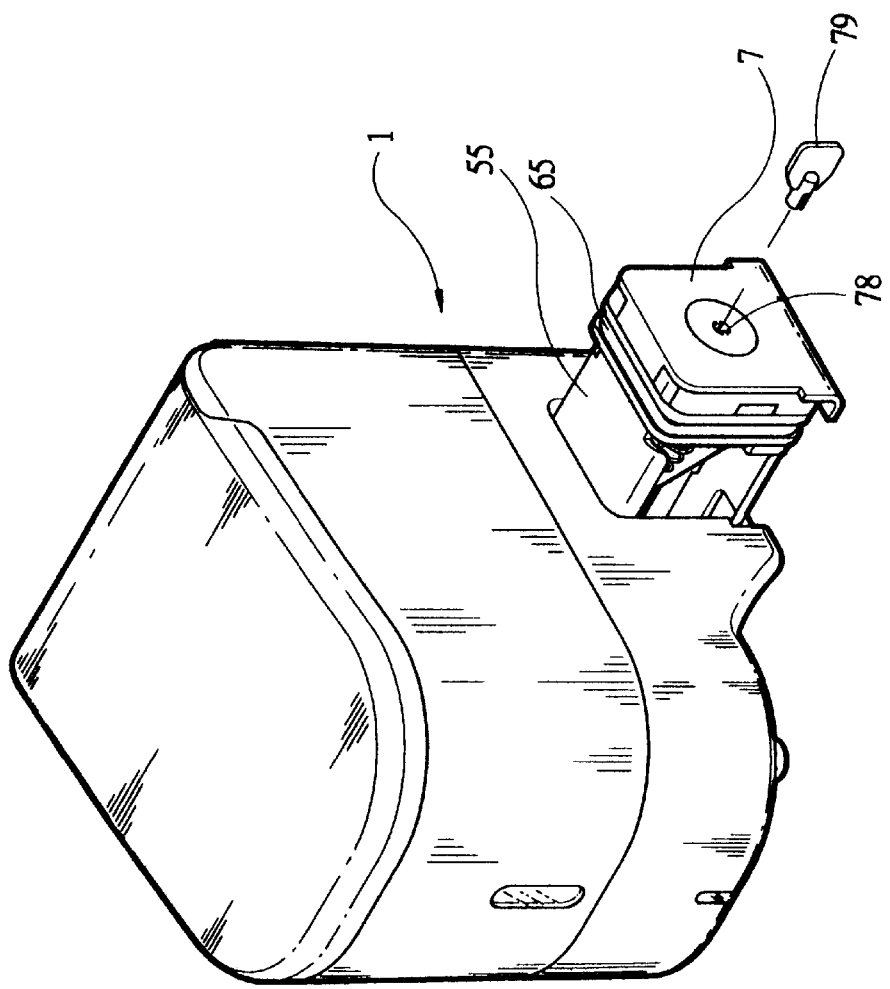
FIG. 7 is a view similar to FIG. 6, where the cover having a key hole.

Referring to FIGS. 1 to 7, there is shown a soap feeding device constructed in accordance with the invention. The soap feeding device is mounted in a housing 1 comprising an upper housing 2 having a reservoir 20 for storing soap and a cover 10 hinged to the soap reservoir 20, and a lower housing 3 having an arrangement 30 for mounting control device 4. A battery compartment 5 is provided in the rear portion of the arrangement 30. A coupling groove is provided in the rear of arrangement 30 for snapping to a mounting plate 16 which is mounted on a fixed place such as wall. A circuit board 40 and a feeding means 44 are provided in the arrangement 30. The battery compartment 5 is laterally disposed having a receiving space 50. An opening 51 is provided in the side of battery compartment 5 for allowing a battery case 55 containing several pairs (e.g., two pairs) of cells to insert into. The battery case 55 is clung to a pair of L-shaped tabs 62 in the rear side 61 of a frame 6. A peripheral groove 64 is provided around the sides 63 of the frame 6. A waterproof rubber ring 65 is provided around the peripheral groove 64. A peripheral tab 66 is provided in the front side of frame 6. A pair of dividers 67 are provided on either side of frame 6, i.e., on either side of peripheral tab 66 surrounding the space 60. A sliding block 8 is provided between the pair of dividers 67. The sliding block 8 has a latch 81 extended from the slot 68 on the peripheral tab 66 provided on the outer periphery of frame 6 to snap in the corresponding recess 52 of receiving space 50. The frame 6 has a peripheral tab 66 snapped to a cover 7 of battery compartment 5. The cover 7 has a center hole 71, two tabs 72 on top and bottom sides for snapping into top and bottom slots 69 on the periphery of peripheral tab 66 respectively, a bottom projection 73, and two side protrusions 74 on the arcuate portion joining the front side and the bottom side. A knob 75 is pivotably provided in the center hole 71 of the cover 7 having an oval flange 76 in the rear and a knob groove 77 or key hole 78 on the front side such that the turning of knob 75 may cause the attached sliding block 8 to move accordingly.

The groove 77 is designed to let a person use, for example a coin to turn the knob 75 (FIG. 6) for locking or unlocking the battery compartment 5, while the key hole 78 is designed to let a person use, for example a customized key 79 to turn the knob 75 (FIG. 7) for locking or unlocking the battery compartment 5. The latter is particularly suitable to be installed in a public place. The turning of key does not interfere with the turning of oval flange 76. This is because sliding block 8 has an engagement end 82 and an open curved passage 83 facing the knob 75 wherein oval flange 76 may insert in and be slidable in the passage 83 (see FIGS. 4 and 5). In the unlocked position of the knob 75, the short edge portions of oval flange 76 are inserted in the passage 83. But if knob 75 is turned clockwise or counterclockwise about 90 degrees, the long edge portions of oval flange 76 are inserted in the passage 83. This causes each sliding block 8 to move outward between the pair of dividers 67 which in turn causes latches 81 to extend outward into the slots 53 adjacent the recesses 52. This secures sliding blocks 8 to frame 6. Latches 81 and passages 83 may be at the same side surface. But this requires the projections 84 to insert between dividers 67. A groove 56 is provided in the rear side 54 of the receiving space 50. A strip 57 is inserted into groove 56. Strip 57 comprises at least one engagement recess 58 (e.g., two recesses are shown). A contact piece 85 is inserted in the engagement recess 58. Contact piece 85 comprises a piece body 86 with edges clung to the engagement recess 58, and a helical spring 87 anchored on the piece body 86 facing the opening 51. Each spring 87 is in electrical contact with a corresponding contact 59 in the rear side of battery case 55. A tab 88 is extended from piece body 86 to contact with cord 89 which in turn is in electrical connection with control device 4. As such, cord 89 connected to the battery case 55 may not be pulled out (i.e., remained in place) when the bottom projection 73 is lifted to pull battery case 55 out. As shown, battery case 55 is configured as two rows two columns with two contacts 59 corresponding to contact piece 85. As such, the power of batteries maybe to the soap feeding device.

The advantages of this invention includes:
1. Waterproof and thus is adapted to a humid environment.
2. Simple procedure to secure the battery compartment to the housing.
3. Quick unfastening and thus effecting an easy replacement of batteries.

While the invention herein disclosed has been described by means of specific embodiments, numerous modifications and variations could be made thereto by those skilled in the art without departing from the scope and spirit of the invention set forth in the claims.

What is claimed is:

1. A soap feeding device mounted in a main housing, the device comprising an upper housing having a soap reservoir and a lower housing having an arrangement comprising:

a front control device;

a rear battery compartment having a cover and a receiving space which receives a battery case with several pairs of cells having a plurality of contacts in a rear outer side thereof, an opening in a side of the battery compartment for allowing the battery case to be inserted therein, a frame abutted on a side of the battery case having a peripheral tab snapped to the cover of the battery compartment, a pair of L-shaped tabs in a rear of the frame clung to the battery case, a peripheral groove formed around the frame, a waterproof rubber ring positioned around the peripheral groove, a pair of dividers on either side of the frame, the peripheral tab positioned on an outer periphery of the frame and having a slot, a sliding block positioned between the pair of dividers and having a latch extended from the slot of the peripheral tab to snap in corresponding recess of the receiving space, and a knob positioned on a center of the cover of the battery compartment, the knob having an oval flange in a rear thereof; and wherein turning of the knob causes the sliding block to move thereby locking or unlocking the battery compartment.

2. The soap feeding device of claim 1, wherein the knob comprises a knob groove on an outer surface thereof.

3. The soap feeding device of claim 1, wherein the knob comprises a key hole on an outer surface thereof.

4. The soap feeding device of claim 3, further comprising a key adapted for the key hole.

5. The soap feeding device of claim 1, wherein the sliding block further comprises an engagement end and an open curved passage facing the knob for permitting the oval flange to insert and slide therein.

6. The soap feeding device of claim 1, further comprising an engagement groove in a rear side of the receiving space that is open to the receiving space, a strip inserted into the engagement groove comprising at least one engagement recess, a contact piece inserted in the recess of the strip comprising a piece body with edges clung to the engagement recess, a plurality of helical springs each anchored on the piece body facing the opening and being in electrical contact with corresponding contacts of the cells of the battery case, and a tab extended from the piece body for electrically connecting with the control device.

* * * * *